US012518414B2

(12) United States Patent
Pang et al.

(10) Patent No.: US 12,518,414 B2
(45) Date of Patent: Jan. 6, 2026

(54) SYSTEMS AND METHODS FOR IMAGE-BASED CHARACTERIZATION OF FLUID IN AN ENCLOSED CONTAINER

(71) Applicant: University of Central Florida Research Foundation, Inc., Orlando, FL (US)

(72) Inventors: Shuo Pang, Oviedo, FL (US); Zheyuan Zhu, Orlando, FL (US); Andrew Klein, Bradenton, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/205,342

(22) Filed: Jun. 2, 2023

(65) Prior Publication Data

US 2023/0394696 A1 Dec. 7, 2023

Related U.S. Application Data

(60) Provisional application No. 63/348,150, filed on Jun. 2, 2022.

(51) Int. Cl.
*G06T 7/62* (2017.01)
*G01F 22/00* (2006.01)
*H04N 23/74* (2023.01)

(52) U.S. Cl.
CPC ............. *G06T 7/62* (2017.01); *G01F 22/00* (2013.01); *H04N 23/74* (2023.01); *G06T 2207/20081* (2013.01)

(58) Field of Classification Search
CPC . H04N 23/74; G06T 7/62; G06T 2207/20081; G01F 22/00
See application file for complete search history.

(56) References Cited

U.S. PATENT DOCUMENTS

| | | | |
|---|---|---|---|
| 6,782,122 B1 * | 8/2004 | Kline | G01F 23/292 |
| | | | 382/142 |
| 2015/0226659 A1 * | 8/2015 | Matayoshi | G01N 21/51 |
| | | | 250/206 |
| 2018/0364268 A1 * | 12/2018 | Kluckner | G01F 23/804 |
| 2019/0192008 A1 * | 6/2019 | Maier-Hein | G06F 18/217 |
| 2019/0265459 A1 * | 8/2019 | Hirata | A61B 1/0669 |
| 2020/0242752 A1 * | 7/2020 | Kakishita | G01N 21/17 |

(Continued)

OTHER PUBLICATIONS

Aparicio et al., "Thermal Propellant Gauging at EOL, Telstar 11 Implementation," in SpaceOps 2008 Conference, May 2008, 6 pages.

(Continued)

*Primary Examiner* — Zhubing Ren
(74) *Attorney, Agent, or Firm* — Suiter Swantz IP

(57) ABSTRACT

An image-based fluid characterization system may include a container configured to fully enclose a fluid, one or more illumination sources configured illuminate an interior portion of the container with illumination and one or more imaging systems. Each of the one or more imaging systems may include a multi-pixel sensor and an optical relay, where the multi-pixel sensor generates one or more images of the fluid in response to the illumination via the optical relay. The system may further include a controller to generate one or more measurements of the fluid based on the one or more images.

23 Claims, 8 Drawing Sheets

(56) References Cited

U.S. PATENT DOCUMENTS

2023/0266120 A1* 8/2023 Rohaly .............. G01B 11/24
356/600

OTHER PUBLICATIONS

Bergaglio et al., "Recent Experiences in European Liquid Spacecraft Propulsion," European Space Research and Technology Centre, Jan. 11-14, 1993, 14 pages.

Burgeson et al., "The performance of point level sensors in liquid hydrogen," The Performance of Point Level Sensors In Liquid Hydrogen, Springer, 1964, 2 pages.

Caimi et al., "Optical Gauging of Liquid and Solid Hydrogen in Zero-g Environments for Space Applications," in AIP Conference Proceedings, May 9, 2006, 9 pages.

Chobotov et al., "Low-gravity propellant gauging system for accurate predictions of spacecraft end-of-life," J. Spacecr. Rockets, vol. 30, No. 1, Jan. 1993, 10 pages.

Crosby et al., "Modal Propellant Gauging: High-resolution and non-invasive gauging of both settled and unsettled liquids in reduced gravity," Acta Astronaut., vol. 159, Feb. 6, 2019, 9 pages.

Dodge, "Propellant mass gauging: database of vehicle applications and research and development studies," NASA/CR-2008-215281, Aug. 2008, 43 pages.

Ho Yang et al., "Flexible Assemblies of Electrocapacitive Volume Tomographic Sensors for Gauging Fuel of Spacecraft," J. Spacecr. Rockets, Mar. 2021, 6 pages.

Hufenbach et al., "Comparative Assessment of Gauging Systems and Description of a Liquid Level Gauging Concept for a Spin Stabilized Spacecraft," in European Spacecraft Propulsion Conference, May 27-29, 1997, 10 pages.

Jacobson et al., "Low-Gravity Sensing of Liquid/Vapor Interface and Transient Liquid Flow," IEEE Trans. Ultrason. Ferroelectr. Freq. Control, vol. 34, No. 2, Mar. 1987, 13 pages.

Muhlenhaupt et al., "Carbon resistors for cryogenic temperature measurement," Cryogenics (Guildf)., Oct. 9, 1963, 30 pages.

NASA Glenn Research Center, "Zero Boil-Off Tank (ZBOT)," Feb. 8, 2022, 9 pages.

Olsen, "An Integrated Hot Wire-stillwell Liquid Level Sensor System for Liquid Hydrogen and Other Cryogenic Fluids," vol. 2074, National Aeronautics and Space Administration, 1963, 36 pages.

Van Dresar, "An uncertainty analysis of the PVT gauging method applied to sub-critical cryogenic propellant tanks," Cryogenics (Guildf)., vol. 44, Jun. 2004, 9 pages.

Yendler et al., "Review of Propellant Gauging Methods," in 44th AIAA Aerospace Sciences Meeting and Exhibit, Jan. 9-12, 2006, 7 pages.

Yendler, "Implementation of Thermal Gauging Method for SpaceBus 3000A (ArabSat 2B)," in SpaceOps 2012 Conference, Jun. 2012, 9 pages.

Zimmerli et al., "Radio Frequency Mass Gauging of Propellants," in 45th AIAA Aerospace Sciences Meeting and Exhibit, Aug. 2007, 14 pages.

* cited by examiner

SYSTEMS AND METHODS FOR IMAGE-BASED CHARACTERIZATION OF FLUID IN AN ENCLOSED CONTAINER

CROSS-REFERENCE TO RELATED APPLICATION

The present application claims the benefit under 35 U.S.C. § 119(e) of U.S. Provisional Application Ser. No. 63/348,150, filed Jun. 2, 2022, naming Shuo Pang, Zheyuan Zhu, and Andrew Klein as inventors, which is incorporated herein by reference in the entirety.

TECHNICAL FIELD

The present disclosure relates to volume gauging systems for liquids in an enclosed container. More specifically, it relates to an image-based volume gauging system which can provide measurements regardless of fluid morphology.

BACKGROUND

A number of specialized volume gauging systems for enclosed containers are well established, but few are adaptable to extreme fluid morphologies. For example, in reduced gravity environments, fluids tend to coalesce and float in large droplets which have no, minimal, or unstable contact with the walls of the container in a way that violates the operating principles of existing technologies. There is therefore a need to develop systems and methods to cure the above deficiencies.

SUMMARY

An image-based fluid characterization system is disclosed in accordance with one or more illustrative embodiments. In one illustrative embodiment, the system includes one or more illumination sources to illuminate an interior portion of a container with illumination, where the container fully encloses a fluid. In another illustrative embodiment, the system includes one or more imaging systems, each of the one or more imaging systems including a multi-pixel sensor and an optical relay, where the multi-pixel sensor is configured to generate one or more images of the fluid in response to the illumination via the optical relay. In another illustrative embodiment, the system includes a controller to generate one or more measurements of the fluid based on the one or more images.

A method is disclosed in accordance with one or more illustrative embodiments. In one illustrative embodiment, the method includes illuminating an interior portion of a container with illumination, where the container is configured to enclose a fluid. In another illustrative embodiment, the method includes generating one or more images of the interior portion of the container based on the interaction of the illumination with the fluid with one or more imaging systems. In another illustrative embodiment, each of the one or more imaging systems include a multi-pixel sensor and an optical relay, where the multi-pixel sensor is configured to generate one or more images of the fluid in response to the illumination via the optical relay. In another illustrative embodiment, the method includes generating one or more measurements of the fluid within the interior portion of the container based on the one or more images.

An image-based fluid characterization system is disclosed in accordance with one or more illustrative embodiments. In one illustrative embodiment, the system includes one or more imaging systems, each of the one or more imaging systems including a multi-pixel sensor and an optical relay, where the multi-pixel sensor is configured to generate one or more images of a fluid within an enclosed container via the optical relay. In another illustrative embodiment, the system includes a controller to generate one or more measurements of the fluid based on the one or more images.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
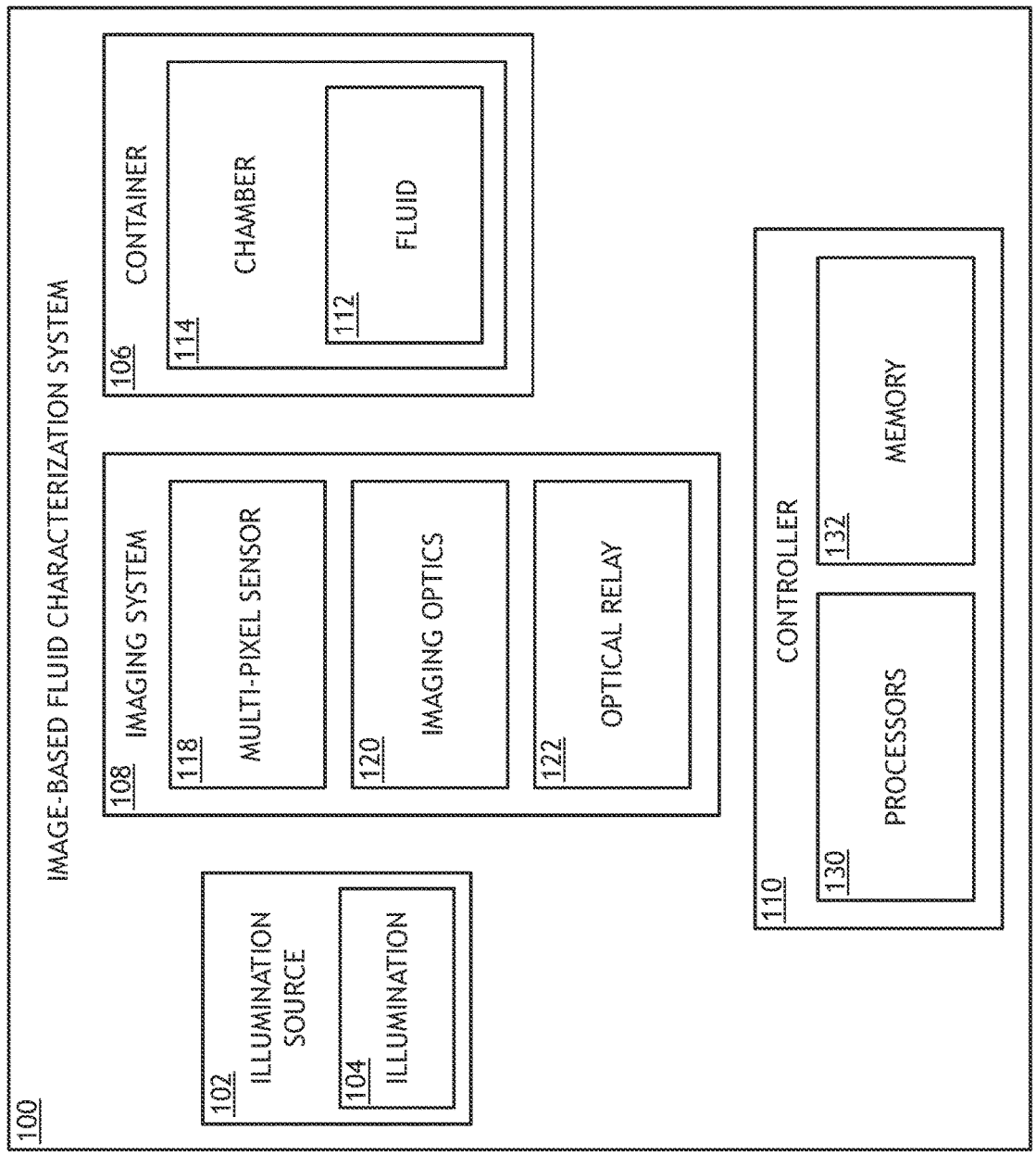
FIG. 1A is a block diagram of an image-based fluid characterization system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for image-based mass and/or volume gauging for a liquid in an enclosed container. The embodiments of the present disclosure pertain to an improved method of gauging the volume of fluid within an enclosed container via imaging the fluid within the enclosed container. The improved method allows for volume gauging to be performed while the fluid is splashing within the enclosed container.

In some embodiments, an image-based volume gauging system includes one or more illumination sources to illuminate an interior of an enclosed container, one or more imaging systems (e.g., cameras) to image the interior of an enclosed container, and a controller to determine a volume of a fluid in the enclosed container based on one or more images from the imaging system.

The systems and methods disclosed herein may provide numerous advantages over existing techniques. In particular, the systems and methods disclosed herein enable volume gauging of a fluid under a wide variety of conditions that may be incompatible with existing technologies. As an illustration, existing technologies may be unsuitable for applications such as, but not limited to, reduced gravity environments or environments that expose a container including the fluid to extreme or unstable forces. For example, the systems and methods disclosed herein enable volume gauging of a fluid that is in motion within a container (e.g., is unsettled). As another example, the systems and methods disclosed herein enable volume gauging of a fluid irrespective of a distribution of the fluid within the enclosed container and irrespective of whether or not portions of the fluid are in contact with walls of the container. As another example, the systems and methods disclosed herein enable volume gauging of a fluid that may be evaporating.

Prior liquid gauging systems perform volume gauging either indirectly or directly. Indirect gauging does not obtain the volume reading from the entirety of the liquid content in the container. Instead, it relies on the presence of liquid at specific locations, or the consumption history of the liquid to indirectly deduce the volume of the liquid. Examples of indirect gauging include bookkeeping and liquid presence detection.

In bookkeeping, flow meters mounted on the ports of the enclosed container keep track of the liquid intake and consumption. Starting with an initial fill volume, the remaining volume at each time step is indirectly deduced from augmenting the total inward and outward flow.

In liquid presence detection, wet-dry sensors detecting the presence of liquid based on the electrical impedance, electrical capacitance, or optical on/off signals can be installed at specific locations inside the container. Readings from multiple of wet-dry sensors indicate the current level of liquid.

The major limitation of indirect gauging methods is that they cannot provide continuous and dynamic monitoring of the fluid level. Bookkeeping cannot keep track of fluids that experience evaporation and outgassing due to passive loss, such as leaks, in the container. Alternatively, fill levels which fall in between successive wet-dry sensors cannot be read. In addition, both require settled fluid conditions to measure the level or flow.

Direct gauging produces a volume reading that depends on the mechanical, thermal, electromagnetic, or optical properties of the entire liquid content. Several mechanisms that directly correlate the volume with one or multiple attributes of the entire liquid content have been developed, including radio frequency gauging, acoustic or ultrasonic gauging, thermal gauging, electrocapacitive volume tomography gauging, and non-imaging optical absorption gauging.

In Radio Frequency (RF) gauging, antennas are inserted into the enclosed container. The reflected power of the container body in the radio-frequency spectrum is measured with a spectrum analyzer. The amount of empty volume within the container changes the resonance peaks in the RF reflection spectrum, which is correlated to the amount of fluid in the tank through calibration.

In acoustic or ultrasonic gauging, the container is subject to a broadband acoustic excitation. Acoustic sensors or ultrasonic transducers placed inside the container captures the acoustic response spectrum. The modal resonance peaks on the spectrum are correlated to the fill level through calibration.

In thermal gauging, methods measure the thermal dynamic properties that correlate with the empty volume in the container. These properties include pressure and/or temperature change when a noncondensing gas, such as Helium, is injected into the container. Alternatively, the thermal capacitance of the container subject to external heating can also be used as an indicator of the empty volume.

In electrocapacitive volume tomography gauging, electrocapacitive volume tomography installs an array of isolated electrodes to measure the capacitance signals at different projections. The 3D volumetric distribution of the liquid inside the container is reconstructed based on the principle of tomography, and the overall volume is obtained.

In non-imaging optical absorption gauging, incident light irradiates the interior of the container, reflected diffusively off the container wall, and is collected by a single optical detector. The detector reading is inversely proportional to the amount of light absorbed in the tank, which is correlated to the amount of fuel present.

A significant design limitation with the existing direct gauging methods is that they rely on settled liquid morphologies, approximating normal operating conditions as closely as possible. Any deviation from the normal operating conditions (e.g., when the container is subject to low-gravity or excessive vibrations) results in increased uncertainty and inaccuracies when using existing direct gauging techniques. For example, radio frequency and acoustic gauging both require settled fluid in the container. Electrocapacitive volume tomography requires fully suspended liquid that does not touch the container wall.

Another problem is that these gauging methods in general require specific and complex modifications to the container. For example, RF gauging, acoustic, and electrocapacitive volume tomography gauging all require the insertion of sensors through the container wall. Thermal gauging requires the injection of an external gas into the container. Non-imaging optical absorption gauging requires highly diffusive reflective coating on the interior wall of the container. These modifications could introduce significantly increased weight, power requirements, size, and expense along with a decrease in system mechanical stability.

Embodiments of the present disclosure utilize optical imaging to observe the dynamic fluidic morphologies and provide a visual feed for monitoring the liquid. Development of imaging-based systems for volume gauging necessitates additional accessories to provide controlled active illumination, image relay, and image processing and analysis. So far, no such embodiments have been developed.

Referring now to FIGS. 1-7, systems and methods for image-based volume gauging of fluid in an enclosed container are described in greater detail, in accordance with one or more embodiments of the present disclosure.

Figure 1B:
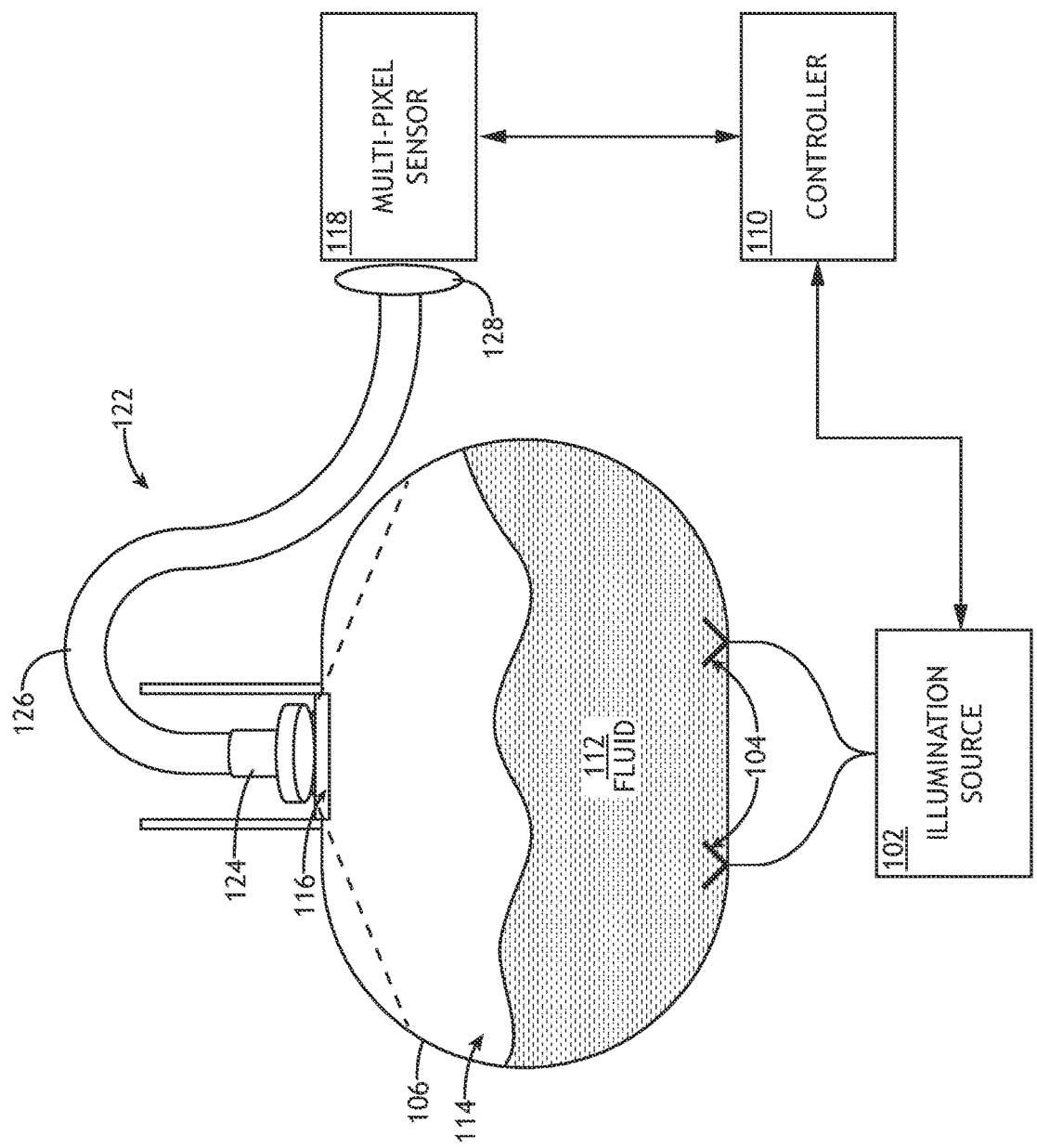
FIG. 1B is a simplified schematic of the image-based fluid characterization system, in accordance with one or more embodiments of the present disclosure.

FIG. 1A is a block diagram of an image-based fluid characterization system 100, in accordance with one or more embodiments of the present disclosure. FIG. 1B is a simplified schematic of the image-based fluid characterization system 100, in accordance with one or more embodiments of the present disclosure.

In some embodiments, the image-based fluid characterization system 100 includes at least one illumination source 102 to generate illumination 104 for illuminating an interior of an enclosed container 106 and at least one imaging system 108 to image the interior of the container 106. In some embodiments, the image-based fluid characterization system 100 includes a controller 110 to generate measurements of one or more properties of a fluid 112 within the container 106 based on one or more images of the interior of the container 106 and/or various additional inputs such as, but not limited to, calibration data, experimental data, simulated data, or predictive data. For example, the controller 110 may generate measurements of properties such as, but not limited to, volume, optical properties (e.g., absorption, transmissivity, reflectivity, scattering, or the like), physical properties (e.g., viscosity, or the like), or chemical properties (e.g., composition, or the like) of the fluid 112.

The container 106 may include any type of vessel suitable for containing a fluid 112 of interest. For example, the container 106 may include one or more internal chambers 114 for enclosing one or more fluids 112 of the same or different types. The container 106 may be fully enclosed, which may provide control over the contents, prevent contaminants, prevent spillage of the fluid 112, allow for pressure and/or temperature control, or the like. Such internal chambers 114 may be fully enclosed (e.g., sealed) or may allow for the passage of fluid 112 between the chambers 114. As an illustration, FIG. 1B depicts a container 106 including a single chamber 114 for containing a fluid 112. Although not shown in FIG. 1B, the container 106 may include one or more ports providing for transfer of the fluid 112 and/or gas into or out of the container 106.

The container 106 and any internal chambers 114 may be formed from any material or combination of materials suitable for containing the fluid 112 of interest such as, but not limited to, metal, plastic, or glass. Further, the container 106 and any internal chambers 114 may have any optical properties. For example, the container 106 and/or any interior chambers 114 may be substantially transparent to light used to generate an image (e.g., transparent to at least a portion of a spectrum of the illumination 104 and/or light emitted by the fluid 112 in response to the illumination 104). As another example, the container 106 and/or any interior chambers 114 may be substantially opaque to light used to generate an image. In some embodiments, the container 106 and any internal chambers 114 include one or more imaging ports 116 to enable imaging of the fluid 112. For example, an imaging port 116 may include, but is not limited to a transparent window or one or more optical elements integrated into a wall. Such an imaging port 116 may be curved or flat. Further, an imaging port 116 may be used to couple illumination 104 into the container 106 and/or light to be collected by an imaging system 108 for generation of an image.

The container 106 and any associated chambers 114 may have any size or shape suitable for containing the fluid 112. In some embodiments, the size and/or shape of the one or more chambers 114 are known (e.g., accessible to the controller 110). In some embodiments, the size and/or shape of the one or more chambers 114 are determined by the image-based fluid characterization system 100 with or without fluid 112 present. For example, the image-based fluid characterization system 100 may determine the size and/or shape of one or more chambers 114 based on one or more images generated by the imaging system 108. As another example, the image-based fluid characterization system 100 may include one or more additional sensors to determine the size and/or shape of one or more chambers 114.

The imaging system 108 may include any number or type of components suitable for imaging at least a portion of an interior portion of the container 106 (e.g., an interior portion of one or more chambers 114). In some embodiments, the imaging system 108 includes a multi-pixel sensor 118 suitable for generating a multi-pixel image and imaging optics 120 suitable for generating an image of at least a portion of an interior of the container 106 onto the multi-pixel sensor 118.

The multi-pixel sensor 118 may include any type of multi-pixel device suitable for generating a multi-pixel image (e.g., image data) based on incident light. For example, the multi-pixel sensor 118 may include a complementary metal-oxide-semiconductor (CMOS) device, a charge-coupled device (CCD), or the like. As another example, the multi-pixel sensor 118 may include an array of individual sensor elements such as, but not limited to, photodetectors or avalanche photodiodes. Further, the pixels of a multi-pixel sensor 118 may be distributed in any one-dimensional or two-dimensional pattern.

The imaging optics 120 may include any number or type of components suitable for generating an image onto the multi-pixel sensor 118. For example, the imaging optics 120 may include one or more lenses and/or curved mirrors.

The imaging system 108 and the associated components may be positioned at any location with respect to the container 106. Further, an image-based fluid characterization system 100 may include multiple imaging systems 108 to provide images of the container 106 from different perspectives. As an illustration, the dashed lines in FIG. 1B may represent a numerical aperture (NA) of the imaging system 108.

In some embodiments, an imaging system 108 or a portion thereof is located within the container 106 (e.g., within a chamber 114). In some embodiments, an imaging system 108 or a portion thereof is located outside the container 106, but configured to image an interior portion of the container 106 (e.g., an interior portion of a chamber 114). For example, an imaging system 108 may be configured to image through one or more portions of the container 106 that are transparent to light used to generate an image such as, but not limited to, one or more walls or one or more imaging ports 116.

In some applications, it may be desirable to isolate a portion of an imaging system 108 (e.g., an imaging system 108, an illumination source 102, or a portion thereof) from the container 106. Such isolation may be thermal isolation, chemical isolation, spatial isolation, or any other form of isolation. For example, it may be desirable to avoid contact between the fluid 112 and one or more components of the imaging system 108. As another example, the container 106 may be kept at a lower temperature (e.g., cryogenically cooled) or a higher temperature than other components of the image-based fluid characterization system 100 (e.g., an imaging system 108, an illumination source 102, or a portion thereof). As another example, the temperature of the multi-pixel sensor 118 may be controlled (e.g., cooled to a temperature below ambient temperature) to improve performance. As another example, it may be desirable to physically locate the multi-pixel sensor 118 and/or any other component of an imaging system 108 in a different location than the container 106.

Any suitable technique may be used to isolate any component of the image-based fluid characterization system 100 from the container 106 and/or the fluid 112 therein. In some applications, one or more components (e.g., an illumination source 102, an imaging system 108, or portions thereof) may be located outside the container 106 and may interact with the fluid 112 via one or more imaging ports 116. In some applications, one or more components may be physically separated from the container 106 (e.g., by a selected distance, behind isolating material, or the like). In such cases, the image-based fluid characterization system 100 may utilize any combination of optical components to couple light to or from the container 106 such as, but not limited to, optical fibers or free-space (e.g., bulk) optical components.

In some embodiments, the imaging system 108 includes an optical relay 122 to relay an intermediate image to the multi-pixel sensor 118. In this way, the multi-pixel sensor 118 may be placed at any location with respect to the container 106 for imaging the contents of the container 106. Any suitable optical relay 122 may be used. For example, an optical relay 122 may include, but is not limited to, one or more imaging fiber bundles or free-space optical elements (e.g., bulk optical elements).

Figure 2:
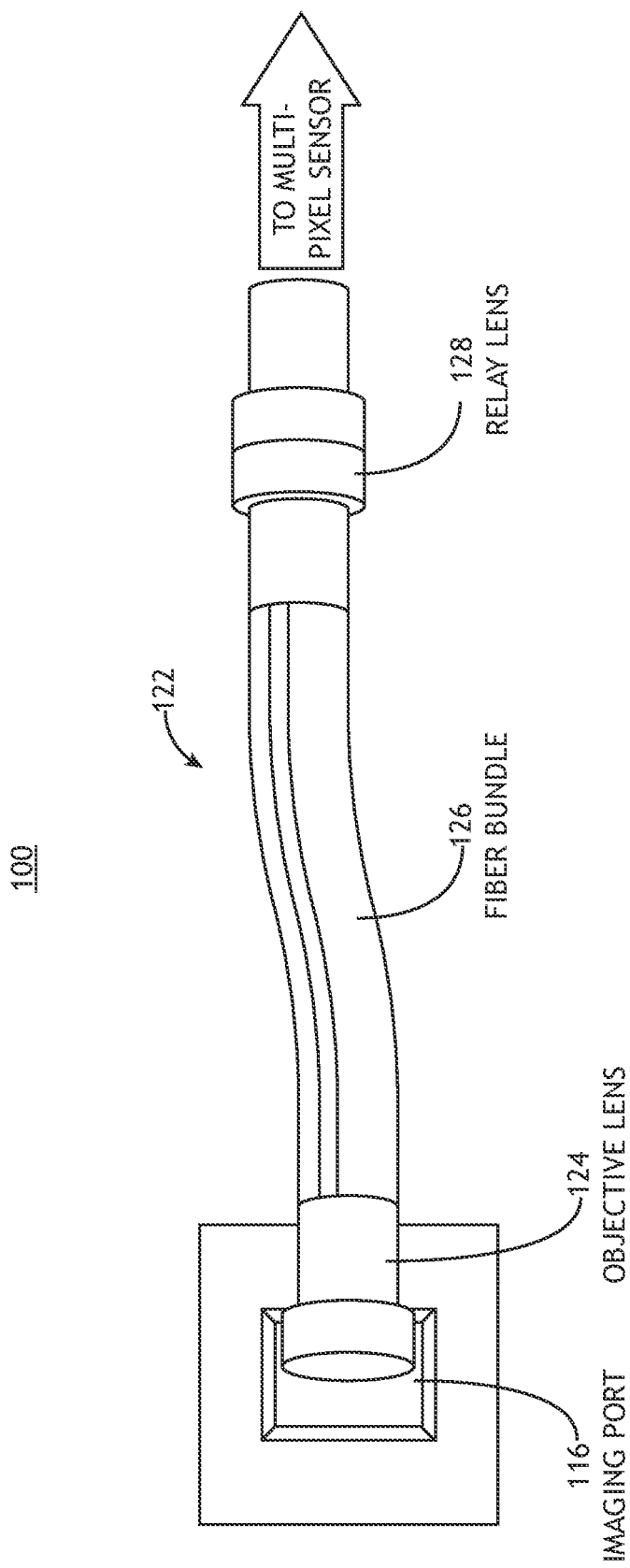
FIG. 2 is simplified schematic of an imaging system including an optical relay, in accordance with one or more embodiments of the present disclosure.

FIG. 2 is simplified schematic of an imaging system 108 including an optical relay 122, in accordance with one or more embodiments of the present disclosure. FIG. 2 may correspond to an enhanced view of the optical relay 122 illustrated in FIG. 1B. In particular, FIG. 2 depicts a non-limiting configuration in which an optical relay 122 includes an objective lens 124 oriented to image an interior portion of a container 106 through an imaging port 116 formed as a transparent window, an imaging fiber bundle 126, and a relay lens 128. In this configuration, the optical relay 122 may image the interior portion of the container 106 to a remotely-located multi-pixel sensor 118. Although not explicitly shown, the optical relay 122 and/or the imaging system 108 more generally may include additional relay lenses to provide an image on the multi-pixel sensor 118.

In some embodiments, the imaging fiber bundle 206 may be customized to withstand the rigors of spaceflight, which may include, but are not limited to, increasing resistance to mechanical shock and vibration, increasing resistance to thermal fluctuation and shock, protecting the fiber bundle from radiation, or minimizing outgassing.

Referring again to FIGS. 1A-1B, the image-based fluid characterization system 100 may include one or more illumination sources 102 suitable for providing illumination 104 suitable for imaging the interior of the container 106. An illumination source 102 may include any type of source capable of emitting illumination 104 suitable for imaging fluid 112 within a container 106. For example, an illumination source 102 may include, but is not limited to, a laser source, a light-emitting diode (LED), or a lamp source.

An illumination source 102 may have any form factor and may direct illumination 104 to an internal portion of the container 106 either directly or through an imaging port 116 using any technique. In some embodiments, an illumination source 102 provides illumination 104 via an optical fiber. For example, an output end of the optical fiber may be coupled to and/or may direct illumination 104 through an imaging port 116. As another example, an output end of the optical fiber may be located inside the container 106. In some embodiments, an illumination source 102 provides illumination 104 via free-space or bulk optical components.

An illumination source 102 may provide illumination 104 having any temporal characteristics. For example, illumination 104 provided by an illumination source 102 may be continuous-wave (CW), pulsed, or otherwise modulated. For instance, pulsed and/or modulated illumination 104 may be used to generate images associated with a temporal duration shorter than an exposure time provided by the multi-pixel sensor 118.

An illumination source 102 may provide illumination 104 having any spectrum (e.g., any wavelengths, ranges of wavelengths, or the like). Further, the illumination source 102 may provide illumination 104 with a static set of properties (e.g., spectrum, pulse length, repetition rate, or the like) or may be tunable to provide illumination 104 with selectable properties. As an example, illumination 104 provided by an illumination source 102 may be broadband, narrowband, or may include two or more distinct spectral bands having any bandwidth. Additionally, the illumination source 102 and/or the image-based fluid characterization system 100 more generally may include additional components (e.g., spectral and/or spatial filters, lenses, homogenizers, or the like) to manipulate the illumination 104 used for imaging.

In some embodiments, a spectrum of the illumination 104 is controlled and/or selected based on properties of a fluid 112 of interest and/or based on properties of the container 106. For example, the spectrum of the illumination 104 may be selected to at least partially overlap with one or more absorption lines of the fluid 112 of interest. In this way, the image-based fluid characterization system 100 may generate one or more measurements of the fluid 112 based at least partially on a measured absorption of the illumination 104 and/or luminescence of the fluid 112 (e.g., fluorescence, phosphorescence, or any other luminescence mechanism) in response to the absorbed illumination 104. As another example, the spectrum of the illumination 104 may be selected to avoid absorption lines of the fluid 112. In this way, the illumination 104 may substantially propagate through the fluid 112, but may be visible in an image due to variations of the index of refraction of the fluid 112 relative to a surrounding medium.

It is contemplated herein that the image-based fluid characterization system 100 may include any number or combination of illumination sources 102 and imaging systems 108 in any arrangement. In this way, the image-based fluid characterization system 100 may provide any combination of images of an interior region of the container 106 from different perspectives and/or properties of the illumination 104. It is further contemplated herein that the relative arrangement between an illumination source 102 and an imaging system 108 may influence the nature of light associated with an image. In a general sense, an illumination source 102 and an imaging system 108 may be arranged to providing imaging based on any interaction mechanism with the fluid 112 including, but not limited to, reflection, refraction, diffraction, scattering, or luminescence.

In some embodiments, the image-based fluid characterization system 100 includes an illumination source 102 and an imaging system 108 arranged on opposite sides of the container 106 that provides a line of sight between the illumination source 102 and the imaging system 108. As an illustration, this arrangement is depicted in FIG. 1B. Such a configuration may be well suited for, but not limited to, measurements of the fluid 112 based on mechanisms by which the fluid 112 modifies incident illumination 104 (e.g., absorption, scattering, diffraction, or the like). For example, such a configuration may provide a peak intensity for a particular pixel when no fluid 112 is present between the illumination source 102 and the imaging system 108 in an optical path associated with that particular pixel, and may provide a reduced intensity when a fluid 112 is present. In some embodiments, the image-based fluid characterization system 100 includes an illumination source 102 and an imaging system 108 arranged with no direct line of sight path between them. For example, the illumination source 102 and an imaging system 108 may be arranged on a common side of the container 106 and/or may be angled to avoid a line of sight (e.g., at a 90-degree angle, at a 45-degree angle, or the like). Such a configuration may be well-suited for, but not limited to, measurements of the fluid 112 based on mechanisms such as, but not limited to, reflection, scattering, diffraction, or luminescence.

Referring again generally to FIGS. 1A-1B, various aspects of the controller 110 will be described in greater detail, in accordance with one or more embodiments of the present disclosure. In some embodiments, the controller 110 includes one or more processors 130 configured to execute program instructions maintained on memory 132 (e.g., a memory medium). The controller 110 may be communicatively coupled with any of the components of the image-based fluid characterization system 100 such as, but not limited to an illumination source 102 or an imaging system 108 (e.g., a multi-pixel sensor 118 therein). In this way, the controller 110 may perform receive data from any such components or control any such components through one or more control signals. The controller 110 may thus perform or direct the performance of any steps disclosed herein. For example, the controller 110 may initiate a measurement of fluid 112 in a container 106 by directing any combination of one or more illumination sources 102 to generate illumination 104 and one or more illumination sources 102 to generate any number of images of the internal portion of the container 106 in any sequence. As another example, the controller 110 may generate one or more measurements of fluid 112 in the container 106 based on any combination of images of the internal portion of the container 106, calibration data, experimental data, simulated data, or predictive data.

The one or more processors 130 of a controller 110 may include any processor or processing element known in the art. For example, the processors 130 may include any device having processing or logic elements such as, but not limited to, one or more micro-processor devices, one or more application specific integrated circuit (ASIC) devices, one or more field programmable gate arrays (FPGAs), or one or more digital signal processors (DSPs)). The one or more processors 130 may thus include any device configured to execute algorithms and/or instructions (e.g., program instructions stored in memory 132). In some embodiments, the one or more processors 130 may include, but are not limited to, a desktop computer, a tablet, a mobile device, a mainframe computer system, a workstation, an image computer, a parallel processor unit, or a networked computer.

The memory 132 may include any storage medium known in the art suitable for storing program instructions executable by the associated one or more processors 130. For example, the memory 132 may include a non-transitory memory medium. By way of another example, the memory 132 may include, but is not limited to, a read-only memory (ROM), a random-access memory (RAM), a magnetic or optical memory device (e.g., disk), a magnetic tape, a solid-state drive and the like. It is further noted that memory 132 may be housed in a common housing with the one or more processors 130 or in one or more different housings. In one embodiment, the memory 132 may be located remotely with respect to the physical location of the one or more processors 130. For instance, the one or more processors 130 may access a remote memory 132 (e.g., server), accessible through a network (e.g., internet, intranet, or the like).

Moreover, different components of the image-based fluid characterization system 100 such as, but not limited to, the illumination source 102 or the imaging system 108 may include processors 130 and/or memory 132 suitable for carrying out at least a portion of the steps described in the present disclosure. In this way, the controller 110 as depicted in FIG. 1A may be provided as a single component or may be distributed between multiple components. Therefore, the above description should not be interpreted as a limitation on the embodiments of the present disclosure but merely as an illustration.

Figure 3:
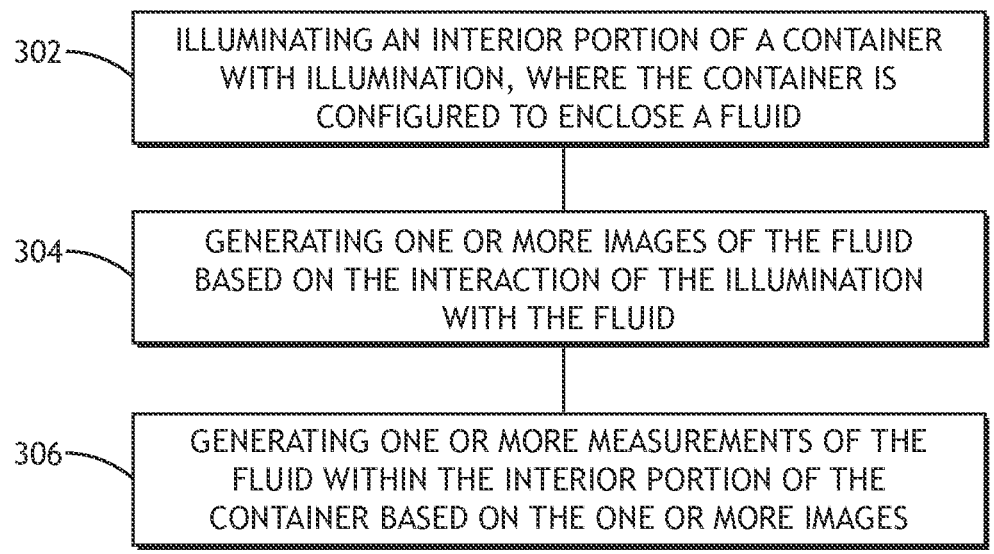
FIG. 3 is a flow diagram illustrating steps performed in a method, in accordance with one or more embodiments of the present disclosure.

Referring now to FIG. 3, FIG. 3 is a flow diagram illustrating steps performed in a method 300, in accordance with one or more embodiments of the present disclosure. Applicant notes that the embodiments and enabling technologies described previously herein in the context of the image-based fluid characterization system 100 should be interpreted to extend to the method 300. For example, the controller 110 (e.g., via the processors 130), may be configured to execute program instructions causing the processors 130 to perform any of the steps of the method 300. It is further noted, however, that the method 300 is not limited to the architecture of the image-based fluid characterization system 100.

In some embodiments, the method 300 includes a step 302 of illuminating an interior portion of a container 106 with illumination 104, wherein the container 106 is configured to enclose a fluid 112. For example, the container 106 may be configured to fully surround or seal the fluid 112 within one or more chambers 114 associated with the interior portion of the container 106. Further, the container 106 may include one or more valves or ports suitable for controlling the flow of the fluid 112 and/or gasses into or out of the container 106.

In some embodiments, the method 300 includes a step 304 of generating one or more images of the fluid 112 based on the interaction of the illumination 104 with the fluid 112. For example, the one or more images may be generated based on any type of light-matter interaction mechanism between the illumination 104 and the fluid 112 such as, but not limited to, reflection, refraction, absorption, scattering, diffraction, or luminescence. Further, the one or more images may be generated with any combination of one or more illumination sources 102 and one or more imaging systems 108, which may be oriented in any configuration relative to the illumination sources 102.

In some embodiments, the method 300 includes a step 306 of generating one or more measurements of the fluid 112 within the interior portion of the container 106 based on the one or more images. The measurements may be provided as a scalar or a set of scalars. Further, the measurements may be provided with an uncertainty estimator.

The measurements may be associated with any properties of the fluid 112 and may include, but are not limited to, a volume of the fluid 112 within the container 106, a distribution of the fluid 112 within the container 106 (e.g., a three-dimensional distribution of the fluid 112, an extent to which the fluid 112 is in contact with walls of the container 106, or the like). Further, any particular measurement may be associated with a single image, multiple images under different conditions (e.g., different illumination 104 and/or different imaging systems 108), or multiple images in a time sequence.

In some embodiments, the step 306 of generating one or more measurements of the fluid 112 includes performing one or more image processing steps to generate one or more processed images and determining one or more measurements of the fluid 112 based on the one or more processed images. For example, image processing steps may be suitable to remove artifacts from the illumination 104 and/or imaging system 108 such as, but not limited to, distortion, aberrations, non-uniform illumination, lensing effects, or masking of a fiber array (e.g., associated with an optical relay 122).

Figure 4:
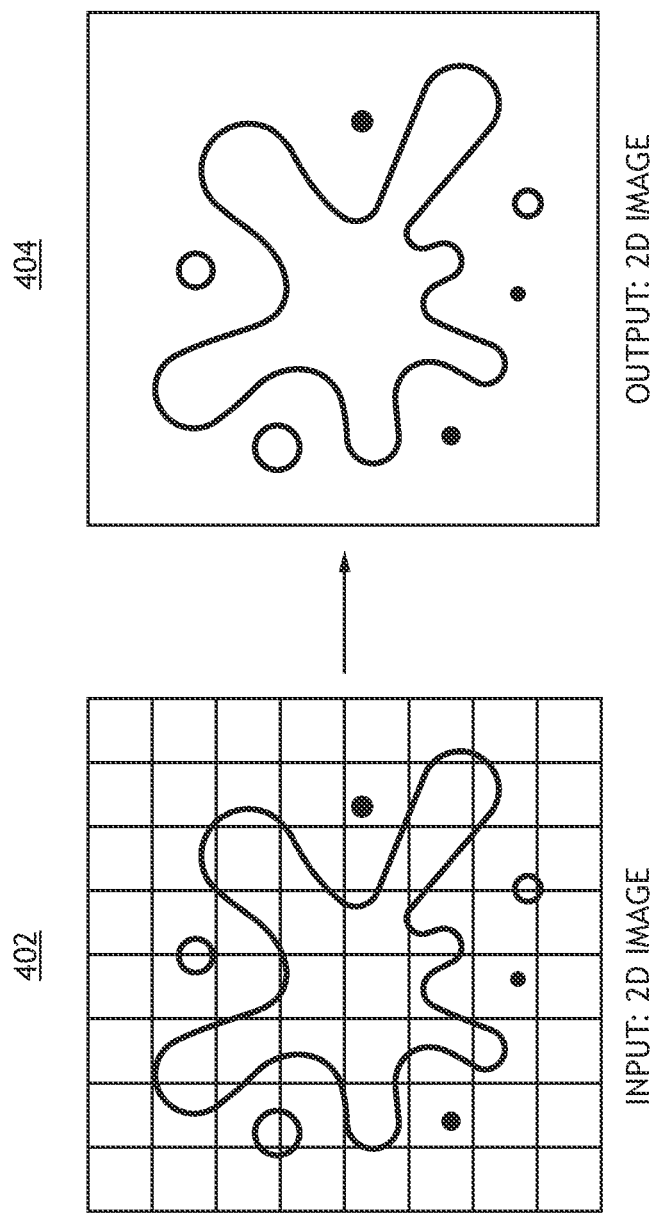
FIG. 4 is a schematic diagram illustrating demasking of an image generated with a fiber-based optical relay, in accordance with one or more embodiments of the present disclosure.

As an illustration, FIG. 4 is a schematic diagram illustrating demasking of an image generated with a fiber-based optical relay 122, in accordance with one or more embodiments of the present disclosure. In particular, FIG. 4 depicts an input image 402 including masking artifacts from a fiber bundle associated with an optical relay 122 and an output image 404 in which the masking artifacts have been removed. Any suitable image processing technique may be utilized in step 306 to remove such artifacts or any type of artifacts.

In some embodiments, the step 306 includes generating one or more measurements of the fluid 112 based on calibration data. For example, calibration data may be used provide baseline conditions such that deviations from the baseline conditions may be attributed to the fluid 112. As another example, calibration data may correlate specific pixel values and/or patterns in the images to properties of the fluid 112 (e.g., volume, composition, optical properties, physical properties, or the like). The calibration data may be generated based on any combination of experimental data under known conditions, simulations, models, or predictions.

Further, a measurement generated in step 306 may correspond to a direct or indirect calculation based on one or more images generated in step 304. For example, a direct calculation may be based directly on image data (e.g., pixel values) with or without calibration, whereas an indirect calculation may be generated from data derived from the image data.

Figure 5:
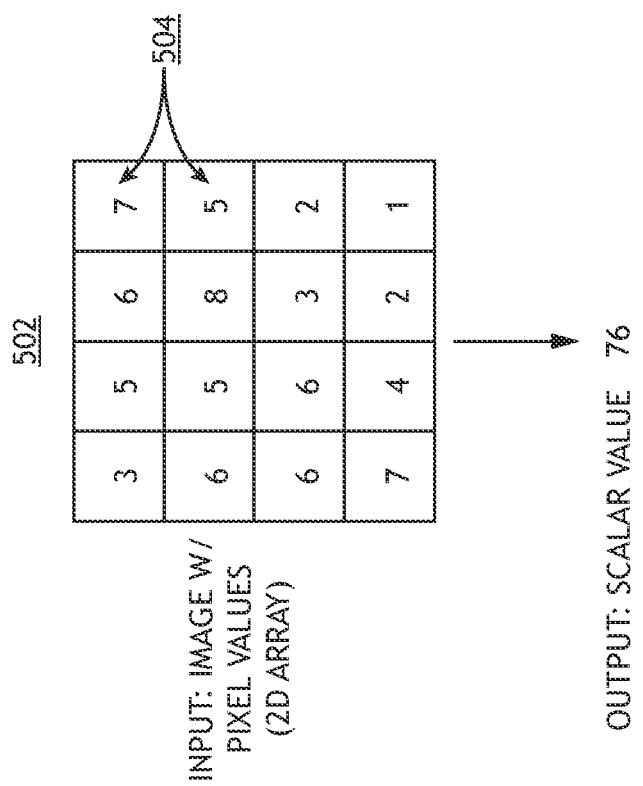
FIG. 5 is a diagram depicting a calculation of a volume of a fluid in a container based on an image generated as illustrated in FIG. 1B, in accordance with one or more embodiments of the present disclosure.
Figure 6:
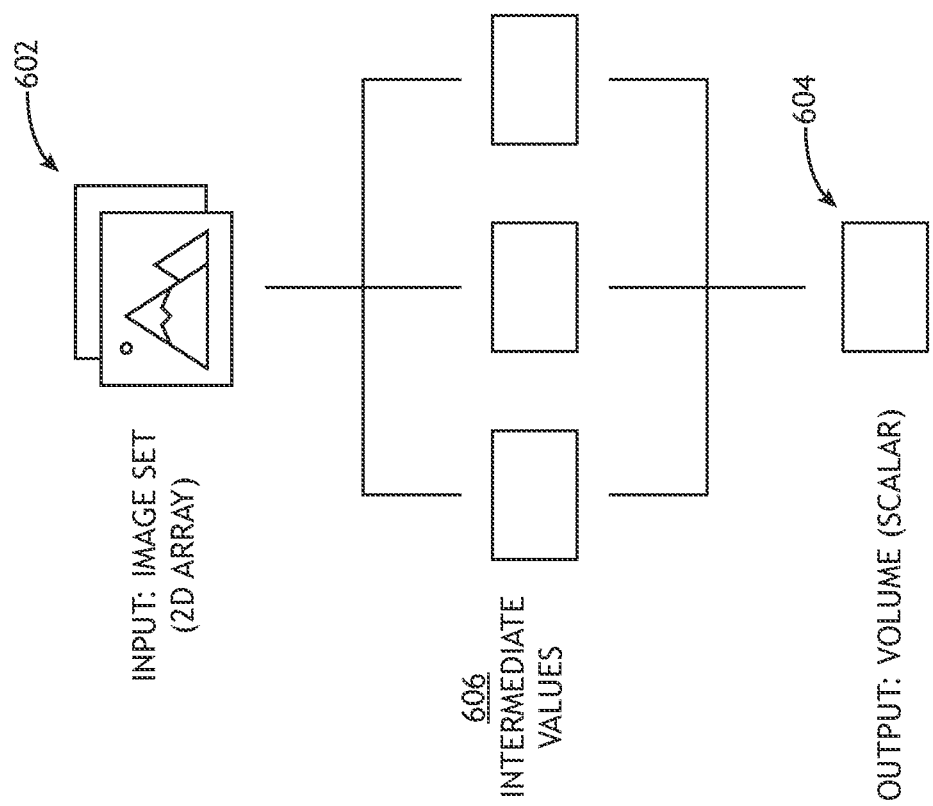
FIG. 6 depicts the use of a descriptive machine learning model to generate measurements of a fluid in a container, in accordance with one or more embodiments of the present disclosure.

Referring now to FIGS. 5-6, non-limiting examples of image-based measurements of a fluid 112 in an enclosed container 106 are described, in accordance with one or more embodiments of the present disclosure.

FIG. 5 is a diagram depicting a calculation of a volume of a fluid 112 in a container 106 based on an image 502 generated as illustrated in FIG. 1B, in accordance with one or more embodiments of the present disclosure. In particular, FIG. 5 depicts a series of 4×4 pixels 504 associated with an image 502, where a pixel value (e.g., a greyscale value) is included within each pixel 504. FIG. 5 further illustrates a non-limiting example of a determination of a volume of a fluid 112 in a container 106 based on transmission of illumination 104 through the fluid 112. In this configuration, each pixel 504 of an image may be associated with a volumetric region of the container 106 as imaged by the imaging system 108, where the pixel value is representative of an intensity of the illumination 104 that propagated through the associated volumetric region of the container 106.

The presence of a fluid 112 within a volumetric region associated with any pixel 504 may reduce the intensity of the illumination 104 that propagates through this volumetric region based on various mechanisms such as, but not limited to, absorption, scattering, or diffraction. Such an intensity reduction may be directly related to the volume of the fluid 112 within this volumetric region through models, simulations, or the like. Further, such an intensity reduction may manifest as a reduction in pixel intensity of an associated pixel 504 in an image 502.

As a result, the pixel intensity across an image 502 may be calibrated (e.g., via calibration data) to provide a spatially-resolved volume measurement of fluid 112 within the container 106. For instance, the calibration data may include one or more calibration images associated with known quantities or distributions of the fluid 112 in the container 106, where the calibration images may be generated using any combination of experimental data (e.g., generated with the imaging system 108), simulated data, or predicted data.

Further, a total volume of fluid 112 (or other measurement) in the container 106 (or at least a volume within portions of the container 106 imaged by a particular imaging system 108) may be determined by pixel-level computation for at least some pixels 504 in at least some of the images (e.g., as intermediate values), where the measurement is based on the pixel-level computations. In the example of a volume calculation, a sum of the pixel values of all relevant pixels may correspond to or representative of volume of the fluid 112. As an illustration, the sum of the pixel values in FIG. 5 is shown as 76. Such a summed value may be calibrated to a total volume using any technique. Calibration data may then directly relate the summed value to volume of the fluid 112 in desired units. In this example, the summed value of pixel data may be considered an intermediate value. As another example, pixel values in an image 502 may be calibrated to relate to spatially-resolved volume (e.g., volume per pixel 504) prior to summation such that the total volume of fluid 112 in the container 106 may correspond to a simple summation of the calibrated pixel values.

In some embodiments, the step 306 of generating one or more measurements of fluid 112 in the container 106 incorporates one or more machine learning models. Such a machine learning model may identify patterns in input data (e.g., be descriptive) and/or may generate prediction data associated with the fluid 112 and/or an imaging system 108 (e.g., be generative). Further, such a machine learning model may implement any type of learning technique such as, but not limited to, supervised learning, unsupervised learning, or reinforcement learning. In a general sense, any type or combination of types of machine learning techniques may be implemented including, but not limited to, neural networks, support vector machines, or transformer-based techniques.

A machine learning model may be trained using any type of training data.

In some embodiments, a machine learning model is trained at least in part with experimental data from one or more imaging systems 108 of fluids 112 with known properties (e.g., volume, physical properties, optical properties, or the like) with known illumination 104. Such experimental data may be generated by the image-based fluid characterization system 100 and/or an equivalent system.

It is contemplated herein that it may not be feasible in some applications to provide sufficient data for training a machine learning model (e.g., training data) through experimental techniques alone. For example, a robust machine learning model may require or at least benefit from substantial training data associated with different types of fluids 112 with different properties (e.g., compositions, physical properties, optical properties, chemical properties, or the like) under different conditions within the container 106 (e.g., temperatures, volumes, gravity levels, vibration levels, or the like). In some embodiments, at least a portion of training data is generated by techniques other than the collection of experimental data (e.g., images of fluids 112 with an imaging system 108). In some embodiments, all training data is generated by techniques other than the collection of experimental data. In a general sense, it may be the case that the image-based fluid characterization system 100 may be used to generate measurements for a fluid 112 under conditions for which no experimental data has been collected.

In some embodiments, a machine learning model is trained at least in part with simulated data associated with fluids 112 with various properties (e.g., volume, physical properties, optical properties, or the like) by one or more imaging systems 108 under simulated illumination 104 conditions. For instance, the simulated data may be generated based on any suitable technique including, but not limited to, ray tracing (e.g., non-sequential ray tracing or any other suitable technique) or finite element analysis. Such simulated data may be generated by the controller 110 or received from an external source.

In some embodiments, a machine learning model is trained at least in part with generated data (e.g., generated images, predicted data, predicted images, or the like) generated by another machine learning technique. For example, a descriptive machine learning model (e.g., a neural network, a support vector machine, or the like) may be trained based on outputs of a generative machine learning model (e.g., a transformer-based model). As an illustration, a generative machine learning model may generate predictive images of what may be generated by an imaging system 108 when viewing fluids 112 with various properties (e.g., volume, physical properties, optical properties, or the like) under various illumination 104 conditions. As another illustration, a generative machine learning model may predict the state (e.g., morphology) of a fluid 112 under various conditions either statically or as a function of time. For instance, a generative machine learning model may be trained to create images of a known volume of a known fluid 112 experiencing zero-g in an enclosed container 106 using an image of the same fluid 112 settled under normal gravity conditions as a prompt. In another instance, a generative machine learning model may generate different morphologies for the known volume of fluid 112. In another instance, a generative machine learning model may generate zero-g morphologies for differing volumes of fluid 112, provided that the corresponding prompt is provided. Further, such a generative machine learning model may itself be trained using any technique or combination of data including, but not limited to, experimental, simulated, or predicted data.

Referring now to FIG. 6, FIG. 6 depicts the use of a descriptive machine learning model to generate measurements of a fluid 112 in a container 106, in accordance with one or more embodiments of the present disclosure. In particular, FIG. 6 depicts a set of one or more images 602 of the fluid 112 provided as inputs and the generation of an output measurement 604 based on the inputs. It is noted that the images 602 may be any combination of images including, but not limited to, images generated by one or more imaging system 108 with known illumination 104 conditions (e.g., real-time images), simulated images, or predicted images. FIG. 6 further illustrates that such a machine learning model may generate one or more intermediate values 606 in the process of providing an output measurement 604. For example, the machine learning model may have a multi-layer feed-forward neural network structure constructed to produce nonlinear mapping from the image set to an intermediate value. The neural network parameters and subsequent mapping from the intermediate value to the volume reading can be obtained from training involving the known volume. It is to be understood that this example is merely illustrative and not a limitation on the machine learning model.

As described previously, such a descriptive machine learning model may be trained on any combination of training data including, but not limited to, experimental data (e.g., images from one or more imaging systems 108 of fluid 112 with known properties under known illumination 104 conditions), simulated data, or predicted data.

Referring again generally to FIGS. 3-6, any particular measurement of a fluid 112 may be based on a single image from an imaging system 108, multiple images from one or more imaging systems 108, and/or additional data (e.g., calibration data, simulated data, predicted data, or the like).

It is contemplated herein that multiple images from one or more imaging systems 108 may be utilized in various ways either alone or with additional data. For example, it may be the case that a single imaging system 108 may not have a sufficient field of view to fully image the entire container 106. In such cases, it may be desirable to generate a measurement (e.g., a volume measurement, or the like) based on images from different imaging systems 108 situated to image the interior portion of the container 106 from different perspectives. As another example, it may be beneficial to generate a measurement based on different light-matter interaction mechanisms (e.g., reflection, refraction, diffraction, scattering, luminescence, or the like). In this case, images from one or more imaging system 108 configured to provide images based on different light-matter interaction mechanisms may be utilized. Such images may further be generated simultaneously or sequentially. As another example, it may be beneficial to generate a measurement based on a common light-matter interaction, but under different illumination 104 conditions. For instance, images generated with illumination 104 having different spectra may provide a measurement with increased certainty compared to a single image representative of a single set of conditions.

As another example, it may be beneficial to generate a measurement based on a series of sequential images representative of the fluid 112 over a selected time span (e.g., a time sequence of images). For instance, low-gravity conditions may result in a complex and/or dynamic distribution of the fluid 112 within the container 106 (e.g., a complex and/or dynamic morphology). Accordingly, a time sequence of images may provide information about the flow and/or morphology of the fluid 112 in the container 106, which may be particularly useful for, but not limited to, measurements of physical properties of the fluid 112 (e.g., volume, viscosity, or the like). As an illustration, dynamics of the fluid 112 including, but not limited to flow, or morphology may be captured and/or modeled based on a time-sequence of images and then further used to augment and/or verify one or more measurements of the fluid 112 (e.g. volume, viscosity, or the like). A time sequence of images may further provide multiple sets of input data that may be used to increase the certainty of a measurement. For instance, volume measurements based on multiple images of the fluid 112 with different morphologies in a selected timespan may allow repeated measurements that may be combined (e.g., averaged, or the like) to form a final output measurement. Further, simulated and/or predicted data associated with flow dynamics may additionally be used to augment the measurement and potentially further increase the certainty and/or accuracy.

Figure 7:
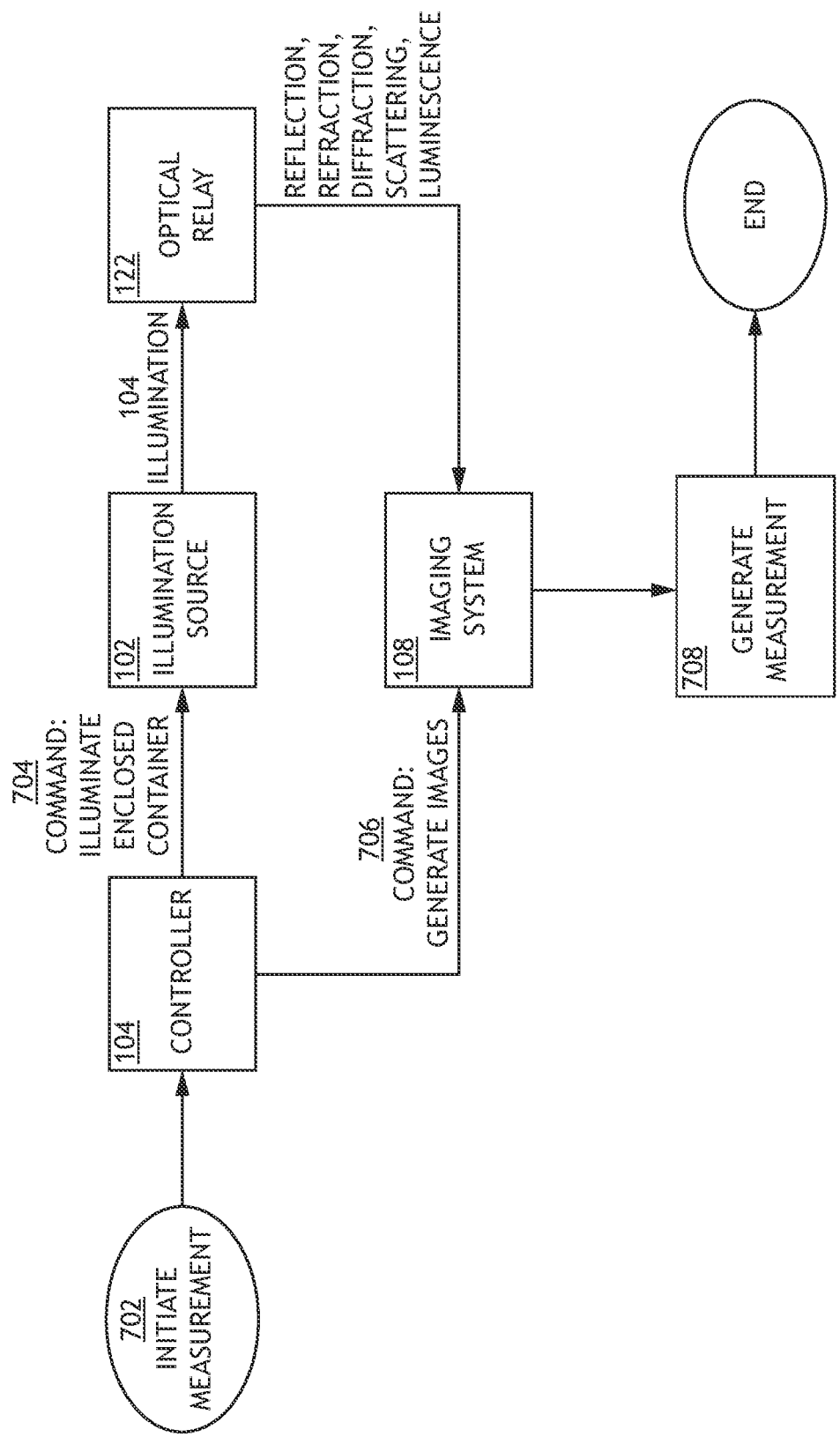
FIG. 7 is a flow diagram illustrating the implementation of the method using the image-based fluid characterization system, in accordance with one or more embodiments of the present disclosure.

Referring now to FIG. 7, FIG. 7 is a flow diagram illustrating the implementation of the method 300 using the image-based fluid characterization system 100, in accordance with one or more embodiments of the present disclosure.

A measurement may be initiated (box 702) either on-demand (e.g., by a user) or periodically. The controller 110 may direct 704 (e.g., command) one or more illumination sources 102 to illuminate the container 106 with illumination 104 having any parameters (e.g., engineered illumination). The controller 110 may also direct 706 one or more imaging systems 108 to generate one or more images of the container 106. Such images may be generated using any technique (e.g., with an optical relay 122) and may be based on any light-matter interactions. The controller 110 may then receive the images and generate one or more measurements (box 708) of the fluid 112 based on the images either directly or indirectly.

Referring now generally to FIGS. 1A-7, it is contemplated herein that the systems and methods disclosed herein may provide numerous benefits over existing measurement (e.g., gauging) technologies. For example, the systems and methods disclosed herein may be well-suited for, but not limited to, space and/or spaceflight application in which a fluid 112 of interest is typically cryogenically cooled and subjected to extreme conditions (e.g., low gravity, zero gravity, vibrations, shock, radiation, outgassing, or the like). However, image-based techniques may provide accurate measurements despite such challenging conditions.

For example, image-based techniques disclosed herein beneficially provide direct visualization of the fluid 112 itself. In some embodiments, a fluid 112 is imaged from multiple perspectives (e.g., using multiple imaging system 108) and/or under different conditions such as, but not limited to, different illumination 104 properties (e.g., spectral properties, temporal properties, spatial properties, or the like), different light-matter interaction mechanisms (e.g., reflection, refraction, scattering, backscattering, diffraction, luminescence, or the like). In some cases, generating multiple images in this way may provide increased certainty of a measurement and/or more accurately characterize a complex morphology of the fluid 112.

As another example, the use of descriptive and/or generative machine learning models (e.g., machine learning techniques, artificial intelligence techniques, or the like) for measurement generation and/or training purposes may enable accurate measurements of a fluid 112 under a wide range of conditions, even those for which experimental training data is not available.

As another example, the systems and methods enable the isolation of sensitive components from the container 106 and/or the fluid 112 therein, which may container 106 be particularly challenging for applications in which the container 106 is cryogenically cooled. Such isolation may be thermal, chemical, spatial, or the like. For example, the use of an optical relay 122 (e.g., a fiber-based optical relay 122, or the like) enables imaging an internal portion of the container 106 while keeping sensitive components such as the multi-pixel sensor 118 thermally and/or spatially isolated from the container 106. An illumination source 102 may be similarly isolated from the container 106 through the use of one or more optical fibers to couple illumination 104 into the container 106.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An image-based fluid characterization system, comprising:
one or more illumination sources configured to illuminate an interior portion of a container with illumination, where the container is configured to fully enclose a fluid;
one or more imaging systems, each of the one or more imaging systems comprising:
a multi-pixel sensor; and
an optical relay, wherein the multi-pixel sensor is configured to generate a time sequence of images of the fluid through a port in the container via the optical relay in response to the illumination when the fluid is unsettled; and
a controller including one or more processors configured to execute program instructions causing the one or more processors to:
generate one or more measurements of the fluid during a selected timespan based on the time sequence of images, wherein at least one of the one or more measurements comprises a measurement of dynamics of at least one of flow or morphology of the fluid during the selected timespan based on the time sequence of images.

2. The image-based fluid characterization system of claim 1, wherein the optical relay includes a fiber bundle.

3. The image-based fluid characterization system of claim 2, wherein the fiber bundle is configured for operation in at least one of spaceflight or space through at least one of shock resistance, vibration resistance, thermal resistance, radiation resistance, or outgassing resistance.

4. The image-based fluid characterization system of claim 1, wherein the multi-pixel sensor of at least one of the one or more imaging systems is separated from the container by the optical relay and is further at least one of thermally or chemically isolated from the container.

5. The image-based fluid characterization system of claim 4, wherein the container is cryogenically cooled, wherein the multi-pixel sensor of each of the one or more imaging systems is thermally isolated from the container.

6. The image-based fluid characterization system of claim 1, wherein the one or more measurements of the fluid comprise:
at least one of a volume of the fluid, a distribution of the fluid in the container, a composition of the fluid, or a viscosity of the fluid.

7. The image-based fluid characterization system of claim 1, wherein generating the one or more measurements of the fluid based on the time sequence of images comprises:
providing the time sequence of images as inputs to a machine learning algorithm, wherein the machine learning algorithm provides the one or more measurements of the fluid in the container as outputs.

8. The image-based fluid characterization system of claim 7, wherein the machine learning algorithm is trained at least in part on training images generated by the one or more imaging systems with known values of the one or more measurements of the fluid.

9. The image-based fluid characterization system of claim 7, wherein the machine learning algorithm is trained at least in part on simulated training images.

10. The image-based fluid characterization system of claim 7, wherein the machine learning algorithm is trained at least in part on training images corresponding to generated images from an additional machine learning model.

11. The image-based fluid characterization system of claim 1, wherein the time sequence of images is generated based on at least one of refraction, reflection, diffraction, scattering or luminescence by the fluid associated with the illumination from at least one of the one or more illumination sources.

12. The image-based fluid characterization system of claim 1, wherein the one or more illumination sources includes a first illumination source, wherein the illumination from the first illumination source has a spectrum that at least partially overlaps with one or more absorption lines of the fluid, wherein the one or more imaging systems includes a first imaging system configured to image the fluid using line of sight imaging through the fluid.

13. The image-based fluid characterization system of claim 12, wherein generating the one or more measurements of the fluid based on the time sequence of images comprises:
performing pixel-level computation for at least some pixels in at least some images of the time sequence of images from the first imaging system; and
generating the one or more measurements of the fluid based on the pixel-level computation.

14. The image-based fluid characterization system of claim 1, wherein at least one image of the time sequence of images is generated based on luminescence by the fluid in response to the illumination from at least one of the one or more illumination sources.

15. A method, comprising:
illuminating an interior portion of a container with illumination from one or more illumination sources, wherein the container is configured to enclose a fluid;
generating a time sequence of images of the fluid in the interior portion of the container through a port in the container with one or more imaging systems based on interaction of the illumination with the fluid when the fluid is unsettled, each of the one or more imaging systems comprising:
a multi-pixel sensor; and
an optical relay, wherein the multi-pixel sensor is configured to generate at least some of the time sequence of images of the fluid via the optical relay in response to the illumination when the fluid is unsettled; and
generating one or more measurements of the fluid during a selected timespan based on the time sequence of images, wherein at least one of the one or more measurements comprises a measurement of dynamics of at least one of flow or morphology of the fluid during the selected timespan based on the time sequence of images.

16. The method of claim 15, wherein the one or more measurements of the fluid comprise:
at least one of a volume of the fluid, a distribution of the fluid in the container, a composition of the fluid, or a viscosity of the fluid.

17. The method of claim 15, wherein generating the one or more measurements of the fluid based on the time sequence of images comprises:
providing the time sequence of images as inputs to a machine learning algorithm, wherein the machine learning algorithm provides the one or more measurements of the fluid in the container as outputs.

18. The method of claim 17, wherein the machine learning algorithm is trained at least in part on training images generated by the one or more imaging systems with known values of the one or more measurements of the fluid.

19. The method of claim 17, wherein the machine learning algorithm is trained at least in part on simulated training images.

20. The method of claim 17, wherein the machine learning algorithm is trained at least in part on training images corresponding to generated images from an additional machine learning model.

21. The method of claim 15, wherein the one or more illumination sources includes a first illumination source, wherein the illumination from the first illumination source has a spectrum that at least partially overlaps with one or more absorption lines of the fluid, wherein the one or more imaging systems includes a first imaging system configured to image the fluid using line of sight imaging through the fluid.

22. The method of claim 21, wherein generating the one or more measurements of the fluid based on the time sequence of images comprises:
performing pixel-level computation for at least some pixels in at least some of the time sequence of images from the first imaging system; and
generating the one or more measurements of the fluid based on the pixel-level computation.

23. An image-based fluid characterization system, comprising:
one or more imaging systems, each of the one or more imaging systems comprising:
a multi-pixel sensor; and
an optical relay, wherein the multi-pixel sensor is configured to generate a time sequence of images of a fluid within an enclosed container through a port in the enclosed container via the optical relay when the fluid is unsettled; and a controller including one or more processors configured to execute program instructions causing the one or more processors to:
generate one or more measurements of the fluid during a selected timespan based on the time sequence of images, wherein at least one of the one or more measurements comprises a measurement of dynamics of at least one of flow or morphology of the fluid during the selected timespan based on the time sequence of images.

* * * * *